United States Patent
Abe (10) Patent No.: US 8,259,216 B2
(45) Date of Patent: Sep. 4, 2012

(54) INTERCHANGEABLE LENS CAMERA SYSTEM HAVING AUTOFOCUSING FUNCTION

(75) Inventor: Takashi Abe, Ehime (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 12/669,303

(22) PCT Filed: Aug. 27, 2008

(86) PCT No.: PCT/JP2008/002325
§ 371 (c)(1),
(2), (4) Date: Jan. 15, 2010

(87) PCT Pub. No.: WO2009/028181
PCT Pub. Date: Mar. 5, 2009

(65) Prior Publication Data
US 2010/0194966 A1    Aug. 5, 2010

(30) Foreign Application Priority Data

Aug. 29, 2007 (JP) .................................. 2007-222400

(51) Int. Cl.
*H04N 5/232* (2006.01)
*H04N 5/225* (2006.01)
(52) U.S. Cl. ....................................... 348/345; 348/360
(58) Field of Classification Search .............. 348/345, 348/353, 354, 360, 349; 396/89
See application file for complete search history.

(56) References Cited

U.S. PATENT DOCUMENTS

| | | | |
|---|---|---|---|
| 7,158,182 B2 * | 1/2007 | Watanabe et al. | 348/345 |
| 7,711,260 B2 * | 5/2010 | Ide et al. | 396/91 |
| 7,973,851 B2 * | 7/2011 | Yajima | 348/346 |
| 8,120,865 B2 * | 2/2012 | Umezu et al. | 359/889 |
| 8,139,140 B2 * | 3/2012 | Yumiki | 348/345 |

(Continued)

FOREIGN PATENT DOCUMENTS

JP    09-074514    3/1997

(Continued)

OTHER PUBLICATIONS

International Search Report for corresponding application No. PCT/JP2008/002325 dated Oct. 7, 2008.

*Primary Examiner* — Nhan T Tran
*Assistant Examiner* — Amy Hsu
(74) *Attorney, Agent, or Firm* — Renner, Otto, Boisselle & Sklar, LLP (57) ABSTRACT

To provide an interchangeable lens camera system for shooting with the best in-focus position, no matter how a group of two or more interchangeable lenses to produce different degrees of spherical aberrations and a group of cameras of different types with different evaluated autofocus frequencies are combined. The camera system of this invention includes a lens unit and a camera body to be removable and attachable from/to each other. The lens unit includes a first computing section for acquiring shooting parameters during a focusing operation and a storage section that stores reference data for changing focus positions according to the contrast of image. The camera body includes an imaging device to output a video signal representing subject's image and a second computing section for measuring the contrast of the image based on its own predetermined evaluated AF frequency during the focusing operation and calculating a correction value based on the shooting parameter and the reference data associated with the highest contrast, thereby changing the focus positions according to the correction value calculated.

11 Claims, 6 Drawing Sheets

U.S. PATENT DOCUMENTS

| | | |
|---|---|---|
| 2003/0063212 A1 | 4/2003 | Watanabe et al. |
| 2004/0036792 A1* | 2/2004 | Moriya et al. ................ 348/345 |
| 2004/0052514 A1* | 3/2004 | Hirai ............................... 396/89 |
| 2004/0130652 A1* | 7/2004 | Sasaki et al. ................... 348/349 |
| 2004/0150724 A1* | 8/2004 | Nozaki et al. ............. 348/211.4 |
| 2005/0128340 A1* | 6/2005 | Ikeda ............................ 348/345 |
| 2005/0185086 A1* | 8/2005 | Onozawa ...................... 348/349 |
| 2006/0056831 A1* | 3/2006 | Horio et al. ..................... 396/55 |
| 2008/0036902 A1* | 2/2008 | Tanaka .......................... 348/353 |

FOREIGN PATENT DOCUMENTS

| | | |
|---|---|---|
| JP | 2003-107332 | 4/2003 |
| JP | 2004-258088 | 9/2004 |
| JP | 2006-178211 | 7/2006 |

\* cited by examiner

| ASSUMED AF FREQUENCY | DISTANCE | CENTRAL AF FRAME | | | VERTICAL AF FRAMES | | | HORIZONTAL AF FRAMES | | |
|---|---|---|---|---|---|---|---|---|---|---|
| | | FOCAL LENGTH | | | FOCAL LENGTH | | | FOCAL LENGTH | | |
| | | f14 | f25 | f50 | f14 | f25 | f50 | f14 | f25 | f50 |
| 40 PAIRS OF LINES PER mm | 3m | a | d | g | j | m | p | s | v | y |
| | 1m | b | e | h | k | n | q | t | w | z |
| | 0.6m | c | f | I | l | o | r | u | x | A |
| 10 PAIRS OF LINES PER mm | 3m | B | E | H | K | N | Q | T | W | Z |
| | 1m | C | F | I | L | O | R | U | X | aa |
| | 0.6m | D | G | J | M | P | S | V | Y | ab |
| 2.5 PAIRS OF LINES PER mm | 3m | ac | af | ai | al | ao | ar | au | ax | aA |
| | 1m | ad | ag | aj | am | ap | as | av | ay | aB |
| | 0.6m | ae | ah | ak | an | aq | at | aw | az | aC |

|  | f14 | f25 | f50 |
|---|---|---|---|
| INFINITE POSITION PULSE | 240 | 150 | 130 |
| 1.5 M PULSE | 500 | 500 | 520 |
| 0.75 M PULSE | 950 | 960 | 970 |
| NEAREST POSITION PULSE | 1200 | 1200 | 1200 |

INTERCHANGEABLE LENS CAMERA SYSTEM HAVING AUTOFOCUSING FUNCTION

TECHNICAL FIELD

The present invention relates to a camera system that can store images electronically. More particularly, the present invention relates to an interchangeable lens camera system with a contrast-based autofocus function, which performs an autofocus operation based on contrast values and of which the lens is interchangeable. Specifically, the camera system of the present invention performs the autofocus function by using the contrast of a video signal falling within a particular band, supplied from an imaging device, as an autofocus evaluated value and setting an in-focus position to be a contrast peak position where the contrast becomes the highest.

BACKGROUND ART

A contrast-based technique has been known as one of various techniques for performing the autofocus (AF) function. The contrast-based technique is often adopted in camcorders for general consumers and compact digital still cameras, of which the lens is non-interchangeable. This is because according to the contrast-based technique, no AF errors should occur theoretically due to a calibration error of the camera's mechanism (which will also be referred to herein as a "residual mechanical error"). It should be noted that according to the phase difference method that is often employed in conventional interchangeable lenses for single-lens reflex cameras, AF errors could occur according to the precision or the calibration error (i.e., the residual error) of the camera's mechanism.

If the number of pixels of the imaging device built in the camera body varied according to the specifications of each individual camera unit, then the evaluated AF frequency would also vary from one camera unit to another. According to the contrast-based AF function, in a situation where the given lens unit has such optical performance that would produce some spherical aberration, if the spatial frequency changed, then the peak position would also shift, which is one of various known problems with the contrast-based AF function. That is to say, if a combination of the evaluated AF frequency and the magnitude of spherical aberration changed, then the relation between the AF position and the best in-focus position would also change. As a result, the best AF performance would no longer be guaranteed. For that reason, the contrast-based AF function has rarely been adopted in interchangeable lens camera systems.

Under circumstances such as these, Patent Document No. 1 proposes a technique for applying a contrast-based AF system to an interchangeable lens camera system for camcorders. Specifically, Patent Document No. 1 discloses a technique for transmitting focus information and focus position information from a camera body to a lens unit that are designed to exchange data between them to get the AF control done by the lens unit.

Patent Document No. 1: Japanese Patent Application Laid-Open Publication No. 2004-258088

DISCLOSURE OF INVENTION

Problems to be Solved by the Invention

According to the contrast-based AF technique, even if a spherical aberration remained only on the lens unit, the contrast peak position would still shift according to the level of the evaluated AF frequency. That is to say, even if the same lens unit is used but if a different camera body is used and if the contrast-based AF function is performed with a different evaluated AF frequency, then the focus position will shift as a result of the AF operation. According to the technique disclosed in Patent Document No. 1, this problem still remains unsolved.

In order to overcome the problems described above, the present invention has an object of realizing an AF function that would allow the user to always shoot with the best in-focus position, no matter how a group of interchangeable lenses of multiple different types that would produce different degrees of spherical aberrations and a group of cameras of multiple different types with mutually different evaluated AF frequencies are combined with each other.

Means for Solving the Problems

A camera system according to the present invention includes a lens unit and a camera body, one of which is removable and attachable from/to the other. The lens unit includes: an optical system for producing an image of a subject; a focusing mechanism for performing a focusing operation by changing a subject distances with at least a portion of the optical system driven continuously; a first computing section for acquiring shooting parameters as the focusing operation is performed; and a storage section that stores reference data for use to correct focus positions according to a contrast of a video. The reference data is defined by a combination of any of two or more assumed AF frequencies for use to measure the contrast and any of the multiple shooting parameters. The camera body includes: an imaging device, which receives the subject's image and outputs a video signal representing the subject's image; and a second computing section for measuring a contrast of the video of the subject based on an evaluated AF frequency proper to the camera body, which has been determined in advance, during the focusing operation and calculating a correction value based on the shooting parameter and the reference data associated with a highest contrast. The focusing mechanism changes the focus positions according to the correction value.

The reference data may be defined by a combination of any of multiple areas on the video of the subject, any of the two or more assumed AF frequencies, and the multiple shooting parameters.

In that case, the reference data may be defined by a combination of any of multiple areas that include a central area of the video of the subject, any the two or more assumed AF frequencies, and the multiple shooting parameters.

Specifically, if the evaluated AF frequency proper to the camera body is different from any of the two or more assumed AF frequencies defined for the reference data, the second computing section may measure the contrast of the video of the subject based on the predetermined evaluated AF frequency proper to the camera body, find one of the two or more assumed AF frequencies that is closest to the evaluated AF frequency proper to the camera body, and calculate the correction value using some of the reference data that is associated with the assumed AF frequency that has been found to be closest.

Alternatively, if the evaluated AF frequency proper to the camera body is different from any of the two or more assumed AF frequencies defined for the reference data, the second computing section may measure the contrast of the video of the subject based on the predetermined evaluated AF frequency proper to the camera body, detect at least two of the two or more assumed AF frequencies, and calculates the correction value by performing an interpolation operation on some of the reference data that is associated with the at least two assumed AF frequencies detected.

An F number during the focusing operation is used as the shooting parameters, associated with each said F number, the reference data may be defined by at least two combinations of the two or more assumed AF frequencies and the multiple shooting parameters.

The reference data may be defined with respect to a full-aperture F number. If an F number during the focusing operation is not equal to the full-aperture F number, the second computing section may calculate a correction value for narrowing a difference between a position where the highest contrast is measured and a best in-focus position associated with the F number, based on the F number, an F number associated with a correction value of zero which is determined in advance, and data representing the difference between the position where the highest contrast is measured and the best in-focus position associated with the full-aperture F number.

If an F number during the focusing operation is greater than a predetermined value, the second computing section may calculate a correction value corresponding to a magnitude of correction of zero.

The reference data may be defined by combinations of respective assumed AF frequencies of at least 2.5 pairs of lines per mm, 10 pairs of lines per mm, and 40 pairs of lines per mm and the multiple shooting parameters.

The optical system may include a lens. The focusing mechanism may move the lens by a distance corresponding to a number of drive pulses, and the reference data and the correction value may be defined by the number of the drive pulses.

The reference data may represent a difference between a position where the contrast becomes the highest and the best in-focus position.

EFFECTS OF THE INVENTION

According to the present invention, during a focusing operation, the contrast of image is measured based on a predetermined proper evaluated AF frequency, and a correction value is calculated based on a shooting parameter and reference data that are associated with the highest contrast. The reference data is used to change the focus positions according to the contrast of the image and has been defined by a combination of any of multiple assumed AF frequencies for use to measure the contrast and multiple shooting parameters to represent the difference between a position where the contrast becomes the highest and the best in-focus position. That is why even if a lens unit and a camera body are used in any of various combinations to form a contrast-based AF interchangeable lens camera system, the shooting operation can always get done at the best in-focus position. For example, if magnitudes of correction are defined as the reference data for various shooting parameters (including multiple focal lengths and multiple subject distances), the shooting operation can always get done at the best in-focus position, no matter how a group of interchangeable lenses of multiple different types that would produce mutually different degrees of spherical aberrations and a group of cameras of multiple different types that would have mutually different evaluated AF frequencies are combined together.

DESCRIPTION OF REFERENCE NUMERALS 1 camera body
2 lens unit
100 camera system
101 imaging device
102 signal processor
103 ALU
105 shutter
110 optical finder device
124, 221 memory
120 system controlling microcomputer
121 LCD monitor
122 reader/writer
123 operating portion
130 camera body's connector
140 camera body's communication contact
201 group of focusing lenses
202 focusing mechanism with actuator
205 diaphragm device
210 group of zoom lenses
211 zoom encoder
220 lens controlling microcomputer
230 lens unit's connector
240 lens unit's communication contact

BEST MODE FOR CARRYING OUT THE INVENTION

Hereinafter, preferred embodiments of the present invention will be described with reference to the accompanying drawings.

Figure 1:
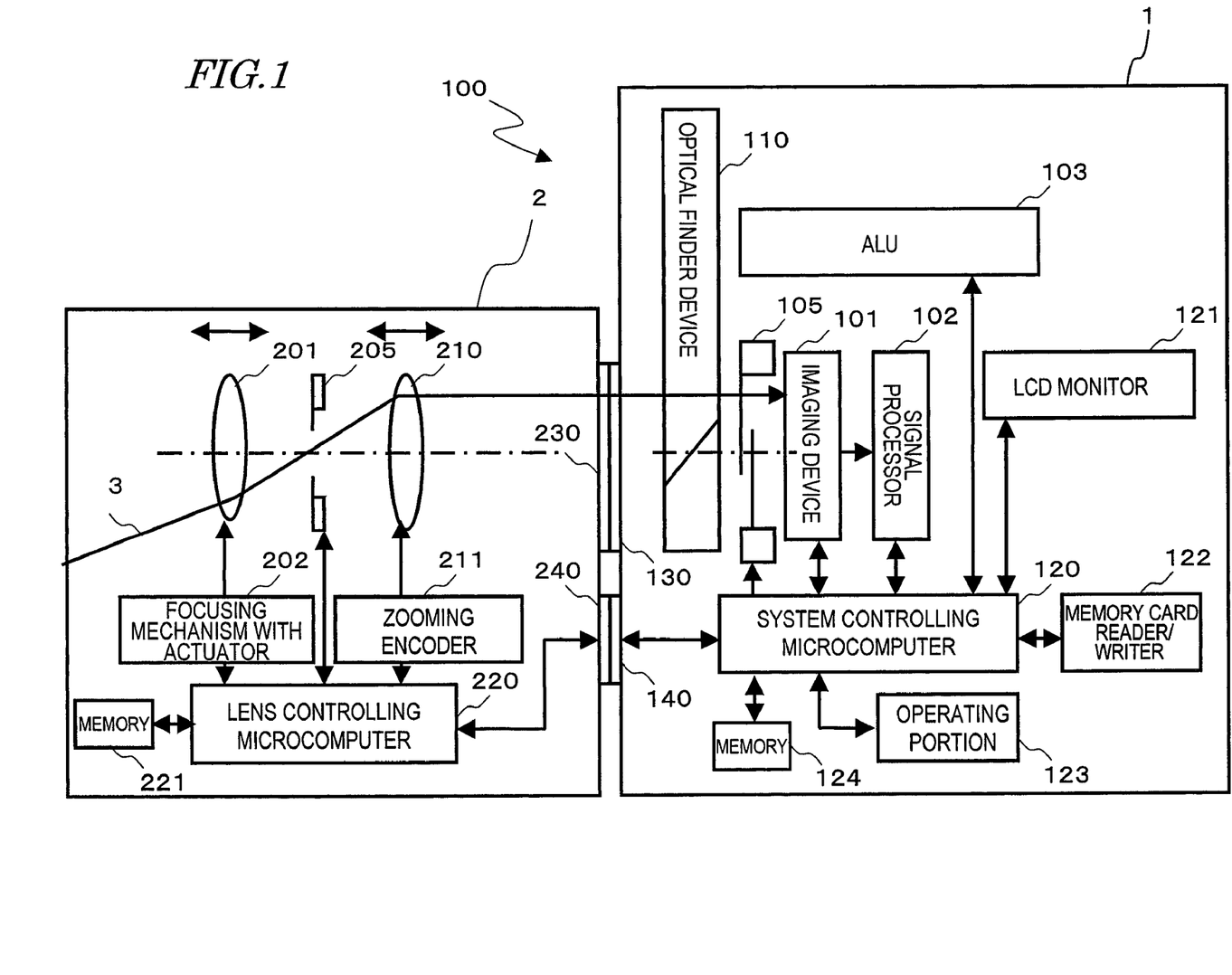
FIG. 1 illustrates a configuration for an interchangeable lens camera system 100 as a preferred embodiment of the present invention.

FIG. 1 illustrates a configuration for an interchangeable lens camera system 100 as a preferred embodiment of the present invention.

The interchangeable lens camera system 100 (which will be simply referred to herein as the "camera system 100") shown in FIG. 1 is comprised of a camera body 1 and a lens unit 2, one of which is removable and attachable from/to the other. The camera body 1 and the lens unit 2 are connected together in such a attachable/removable state with their connectors 130 and 230. When the camera body 1 and the lens unit 2 are connected together, their communication contacts 140 and 240 make electrical contact with each other, thereby enabling the camera body 1 and the lens unit 2 to communicate with each other.

The camera body 1 includes an imaging device 101, a signal processor 102, an arithmetic and logic unit (ALU) 103, a shutter 105, an optical finder device 110, a system controlling microcomputer 120, a liquid crystal monitor 121, a memory card reader/writer 122, an operating portion 123 and a memory 124.

The imaging device 101 receives a subject's image, which has been produced optically by the lens unit 2, and outputs an electrical signal. In this case, the electrical signal is a chrominance signal representing the color components in red (R), green (G) and blue (B) that form the subject's image. The signal processor 102 converts the electrical signal that has been generated by the imaging device 101 into a digital signal and then subjects the electrical signal to various types of image signal processing including grayscale conversion and white balance processing.

The ALU 103 makes computations to perform a contrast-based AF control as will be described in detail later.

The shutter 105 controls the amount of light 3 falling on the imaging device 101 by adjusting how long the shutter 105 is opened before being shut.

The optical finder device 110 is used by the user to decide his or her favorite composition.

The memory 124 stores the data that has been supplied from the system controlling microcomputer 120 and outputs data that has been requested by the system controlling microcomputer 120.

The system controlling microcomputer 120 controls the overall operation of this camera system 100 including not just every component in the camera body 1 but also the lens unit 2 as well. The system controlling microcomputer 120 can read the control data that is stored in the memory 124. Also, the system controlling microcomputer 120 and a lens controlling microcomputer 220 (to be described later) have the ability to communicate with each other. Thus, the system controlling microcomputer 120 receives AF correction data (see FIG. 6) and distance/area data (see FIG. 9) from the lens controlling microcomputer 220 and stores them in the memory 124.

The LCD monitor 121 is a liquid crystal display to present various settings of the camera system 100 and an image that is going to be shot and/or image shots thereon. The memory card reader/writer 122 (which will be simply referred to herein as a "reader/writer 122") can store the image data that has been processed in a memory card and can also read the image data that is stored in the memory card. In this example, the storage medium is supposed to be a semiconductor memory card with a flash ROM, which is removable from the camera body 1. However, this is just an example. Alternatively, the storage medium may also be an optical disc, a magnetic disk, a magnetic tape or even a semiconductor memory (such as a flash ROM) that is built in the camera body 1.

The lens unit 2 has a lens optical system for producing an image optically and a mechanism for controlling the optical system. Specifically, the lens unit 2 includes a group of focusing lenses 201, a focusing mechanism with actuator 202, a lens stop 205, a group of zooming lenses 210, a zoom encoder 211, a lens controlling microcomputer 220 and a memory 221.

The group of focusing lenses 201 contributes to getting focusing done by moving parallel to the optical axis. The focusing mechanism with actuator 202 detects the current position of the group of focusing lenses 201 and moves them to a target position. The lens stop 205 adjusts the amount of incoming light according to the aperture.

The group of zooming lenses 210 also moves parallel to the optical axis to zoom in on, or out of, the subject's image. The zoom encoder 211 senses the zooming state.

The lens controlling microcomputer 220 reads necessary data from the memory 221 and controls the whole lens unit 2 including the respective devices described above. The memory 221 stores not only control data to be used by the lens controlling microcomputer 220 to control the overall operation of the lens unit 2 but also AF correction data (seem FIG. 6) and distance/area data (see FIG. 9) as will be described in detail later.

This camera system 100 operates in accordance with a user's command that has been entered through the operating portion 123 on the camera body.

Hereinafter, it will be described how this camera system 100 performs a contrast-based AF control.

Figure 2:
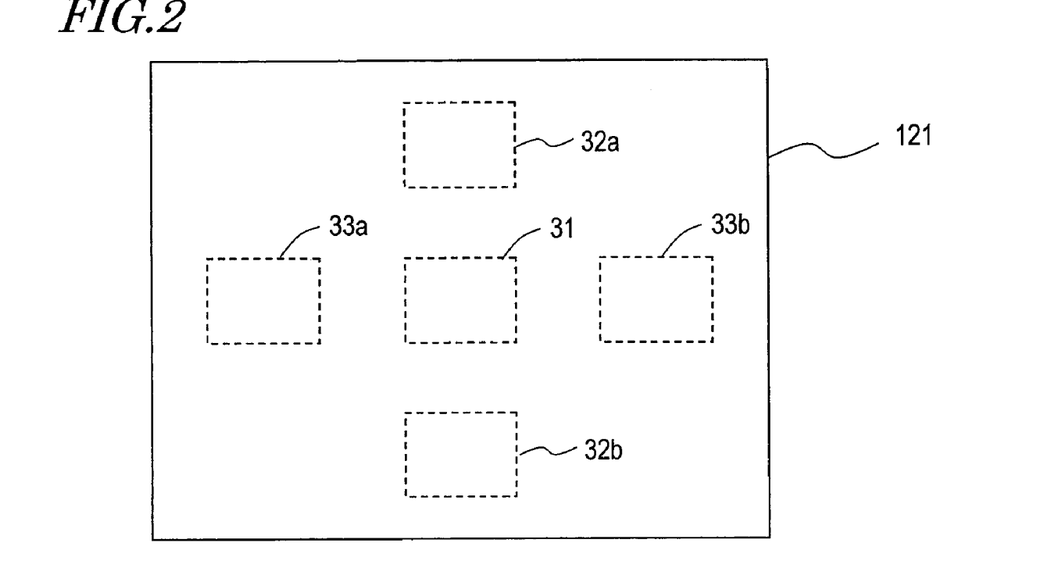
FIG. 2 illustrates five AF frames 31, 32a, 32b, 33a and 33b that are displayed on an LCD monitor 121.

FIG. 2 illustrates five AF frames 31, 32a, 32b, 33a and 33b that are displayed on the LCD monitor 121. With this arrangement of the five AF frames into consideration, the AF frame 31 will be referred to herein as a "central AF frame", the AF frames 32a and 32b "vertical AF frames" and the AF frames 33a and 33b "horizontal AF frames", respectively. It should be noted that the number and arrangement of these AF frames are just an example and could be changed if necessary. Also, the AF frames are supposed to be set on the LCD monitor 121. But this is also just an example to allow the reader to understand this invention more easily. The AF frames do not always have to be displayed on the LCD monitor 121. Instead, the AF frames may also be defined in any image area with the display area of the LCD monitor 121.

In this preferred embodiment, the ALU 103 of the camera body 1 measures the contrast of the respective AF frames shown in FIG. 2 during the AF operation. And the ALU 103 finds a position where the contrast becomes the highest in the central AF frame 31 (i.e., where a curve representing the contrast measured reaches a peak), for example. A conventional camera system is designed to get a shooting operation done using that peak position as the best in-focus position. In this preferred embodiment, however, that position is shifted to define a position where the best contrast can be obtained to be the best in-focus position, no matter where the position is located in the central area or peripheral area of the screen. The correction processing of this preferred embodiment will be described in detail later.

Hereinafter, it will be described with reference to FIG. 3 how to measure the contrast.

Figure 3:
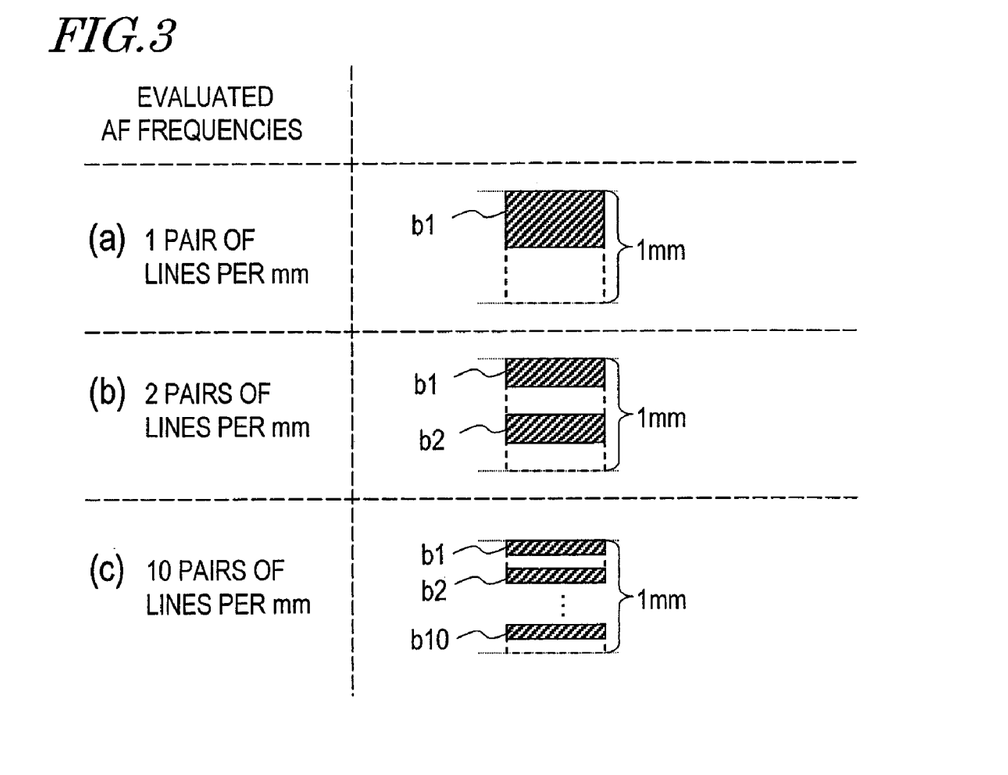
FIG. 3 shows evaluated AF frequencies proper to the camera body 1.

FIG. 3 shows evaluated AF frequencies proper to the camera body 1.

The contrasts are measured while the focus position is changing continuously by driving the group of focusing lenses 201. For example, the ALU 103 may obtain values within the evaluated AF frequency band one after another based on the image displayed within the central AF frame 31 while the focus position is changing continuously. These values are called "AF evaluated values" or "detected values" and correspond to so-called "contrast values", the maximum value of which is detected as a peak of the contrast.

In this case, the "contrast value" is defined by the following equation:

Contrast value=(maximum luminous intensity−minimum luminous intensity)/(maximum luminous intensity+minimum luminous intensity)

As used herein, the "evaluated AF frequency" is a value proper to the camera body 1 and is a centroid frequency representative of the frequency band for use to measure the contrasts. An evaluated AF frequency of n pairs of lines per mm means that n pairs of black and white lines appear within each range with a width of 1 mm. In other words, it can be said that if the evaluated AF frequency is n pairs of lines per mm, n black lines will appear within each range with a width of 1 mm. The n value is determined according to the specific type of the camera body 1.

As shown in portion (a) of FIG. 3, if the evaluated AF frequency is one line per mm, then only one black line b1 appears within each range with a width of 1 mm. On the other hand, if the evaluated AF frequency is two pairs of lines per mm, then two black lines b1 and b2 appear within each range with a width of 1 mm as shown in portion (b) of FIG. 3. And if the evaluated AF frequency is ten pairs of lines per mm, then ten black lines b1 through b10 appear within each range with a width of 1 mm as shown in portion (c) of FIG. 3. As can be seen, the lower the evaluated AF frequency, the greater the value within the evaluated AF frequency band and the higher the peak of contrast. Stated otherwise, the higher the evaluated AF frequency, the smaller the value within the evaluated AF frequency band and the lower the peak of contrast.

Figure 4:
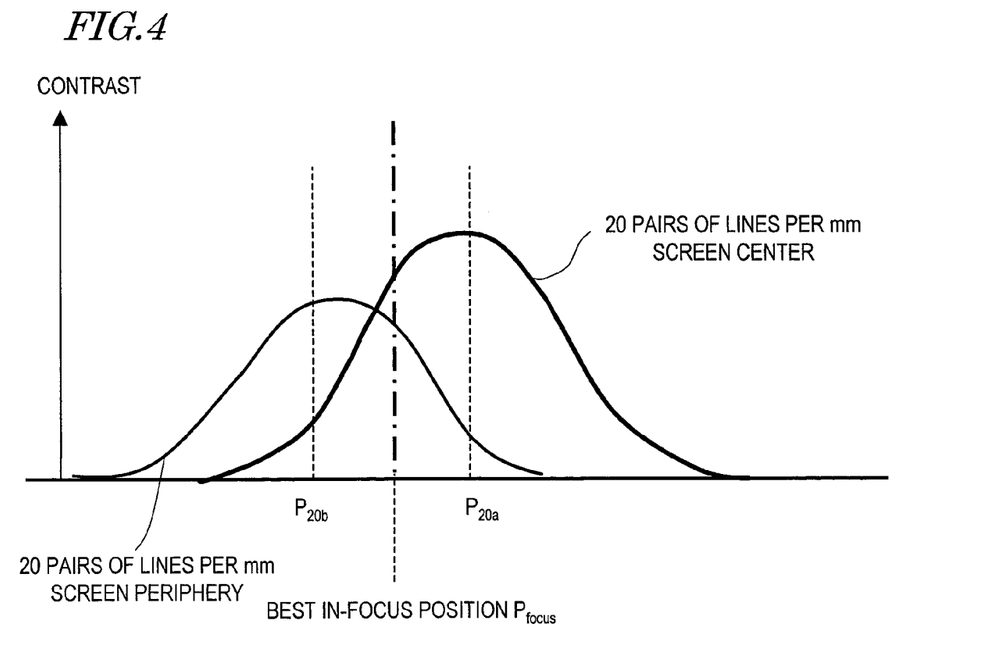
FIG. 4 shows how the contrast peak positions $P_{20a}$ and $P_{20b}$ change with respect to the best in-focus position $P_{focus}$ according to the location of the AF frame on the screen in a situation where the evaluated AF frequency is 20 pairs of lines per mm.

The peak of contrast changes depending on where the AF frame to use is located. FIG. 4 shows how the contrast peak positions $P_{20a}$ and $P_{20b}$ change with respect to the best in-focus position $P_{focus}$ according to the location of the AF frame on the screen in a situation where the evaluated AF frequency is 20 pairs of lines per mm.

A curve representing the contrasts that were detected using the central AF frame 31 is identified by "screen center", while a curve representing the contrasts that were detected using either the vertical AF frames 32a and 32b or the horizontal AF frames 33a and 33b is identified by "screen periphery". As can be seen from FIG. 4, the peak positions $P_{20a}$ and $P_{20b}$ do not agree with each other and are both different from the best in-focus position $P_{focus}$. It should be noted that the "screen periphery" may be a position at a 0.7 image height, for example, and is different from the upper limit AF frame position or the peak $P_{20b}$ for the horizontal frame.

It should be noted that the "best in-focus position $P_{focus}$" is defined herein to be a position where the contrast is well balanced between the screen center and the screen periphery (i.e., a position where the in-focus state is achieved well over the required level both at the screen center ($P_{20a}$) and at the screen periphery ($P_{20b}$)) in a situation where the evaluated AF frequency is 20 pairs of lines per mm.

However, the best in-focus position may also be defined at any of various other positions, not just the position mentioned above. Specifically, the best in-focus position may be an evaluated AF frequency peak position at the center of the screen. Alternatively, the best in-focus position may also be shifted from the evaluated AF frequency peak position at the screen center to a predetermined degree in order to optimize the contrast over the entire screen with the curvature at the screen periphery taken into consideration.

Figure 5:
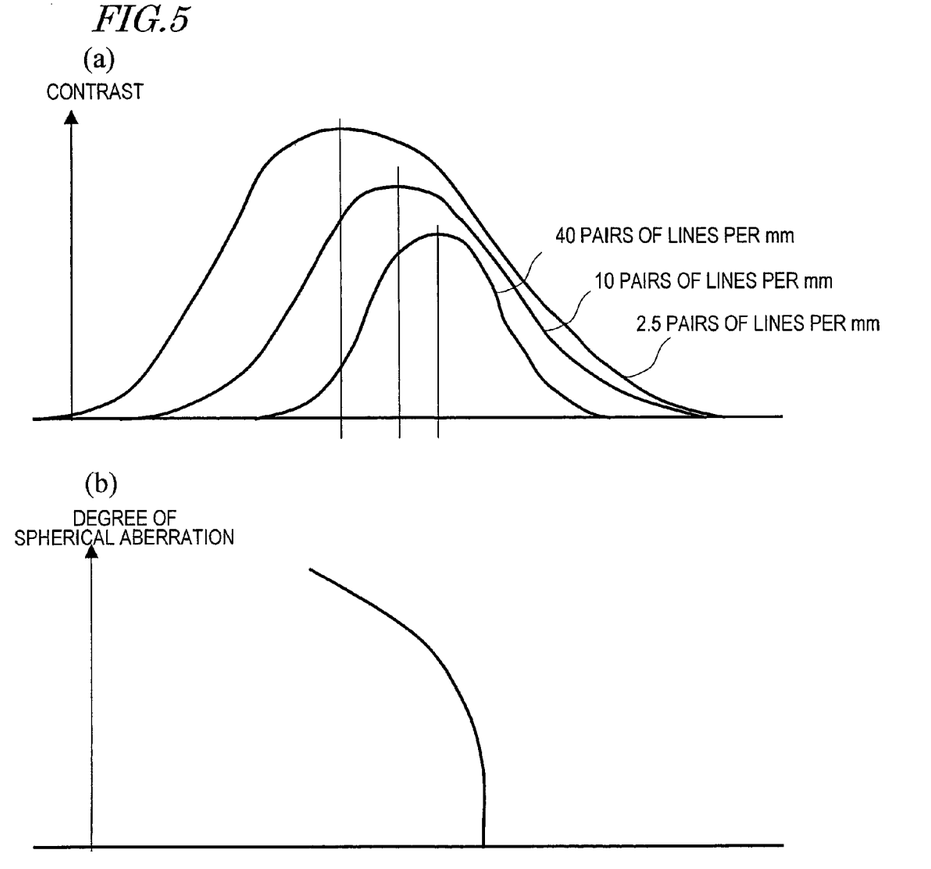
FIGS. 5(a) and 5(b) show the relation between the respective peaks of contrast associated with three different evaluated AF frequencies and the spherical aberration.

It should be noted that the peak of contrast also varies with the spherical aberration that could be produced by lenses included in the lens unit 2. FIGS. 5(a) and 5(b) show the relation between the respective peaks of contrast associated with three different evaluated AF frequencies and the spherical aberration. It is known that a lens that will produce a spherical aberration as shown in FIG. 5(b) (when under-corrected) tends to have peaks of contrast that shift according to the frequency as shown in FIG. 5(a). If a lens did not produce any spherical aberration at all (i.e., if the curve representing the spherical aberration as shown in FIG. 5(b) were represented as a line parallel to the y-axis), then the contrast peak position would not depend on the evaluated AF frequency but remain the same irrespective of the evaluated AF frequency.

Now look at FIG. 4 again. The camera system 100 of this preferred embodiment changes the amounts to which the group of focusing lenses 201 is driven such that the focal point agrees with the best in-focus position $P_{focus}$. For that purpose, first of all, the camera system 100 drives the group of focusing lenses 201 to find positions where the contrast becomes maximum (e.g., the peak positions $P_{20a}$ and $P_{20b}$ shown in FIG. 4) for a certain AF frame and then changes the amounts to which the group of focusing lenses 201 is driven.

For example, if a peak of contrast has been detected using the central AF frame 31, the camera system 100 changes the amounts to which the group of focusing lenses 201 is driven such that the peak position $P_{20a}$ detected agrees with $P_{focus}$. On the other hand, if a peak of contrast has been detected using the vertical AF frames 32a and 32b or the horizontal AF frames 33a and 33b, the camera system 100 changes the amounts to which the group of focusing lenses 201 is driven such that the peak position $P_{20b}$ detected agrees with $P_{focus}$.

It depends on the AF frame that has been used to detect the peak of contrast, the evaluated AF frequency, the focal length f and the subject distance how much the amounts of driving should be changed. However, it is not a practical measure to take to provide correction data that defines every possible combination of them.

That is why according to this preferred embodiment, correction reference data is defined as a combination of multiple representative values (which will be referred to herein as "AF correction data") of the AF frame, focal length, evaluated AF frequency, and subject distance.

Figure 6:
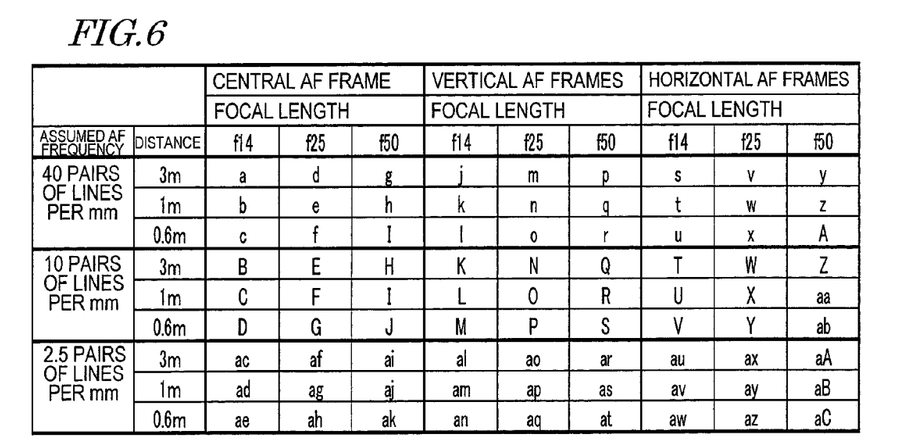
FIG. 6 shows an exemplary AF correction data format as an example of data specifications for a situation where F is 3.5 and the focal length f is in the range of 14 mm to 50 mm.

FIG. 6 shows an exemplary AF correction data format as an example of data specifications for a situation where F is 3.5 and the focal length f is in the range of 14 mm to 50 mm. In this example, the nearest possible distance is supposed to be 500 mm. This AF correction data is stored as lens unit's own values in the memory 221 (see FIG. 1). The "evaluated AF frequency" described above is a value to be determined by each specific camera body 1. That is why to avoid confusions, the evaluated AF frequency is called an "assumed AF frequency" in the example shown in FIG. 6.

The AF correction data shown in FIG. 6 is defined for three assumed AF frequencies of 40 pairs of lines per mm, 10 pairs of lines per mm and 2.5 pairs of lines per mm. And each of these assumed AF frequencies is combined with various shooting parameters and their values are described for every possible combination of those shooting parameters. Specifically, the focal lengths (i.e., degree of zooming) are represented by the three values of f14, f25 and f50, the subject distances are represented by the three values of 3 m, 1 m and 0.6 m, and AF frames are classified into the three groups of the central AF frame, the vertical AF frames and the horizontal AF frames. As a result, the AF correction data is made up of 81 items of data in total.

Data about F numbers could be further added but is not used in this preferred embodiment. The reason is as follows. Specifically, it is known that the smaller the aperture of the lens stop, the smaller the value of the AF correction data and the lesser the need for AF correction. Thus, suppose it is already known that the lens unit 2 comes to have an AF correction data value of zero at F8 in this preferred embodiment. And also suppose that the AF correction data associated with F numbers between the full-aperture F number and F8 is figured out by making the interpolation to be described later. In that case, since there is no need to store the data value of zero, only the AF correction data associated with the full-aperture F number should be stored, and therefore, no data about the F numbers is needed.

The values a through z, A through Z, aa through az, and aA through aC described as the AF correction data are expressed as the number of pulses (or a pulse width) applied to the focusing mechanism with actuator 202 (or the actuator, in particular) to drive at least some of the group of focusing lenses 201. If the group of focusing lenses 201 is driven with such a number of pulses, then the focus position can be shifted by the distance from the peak position in a situation where the peak of contrast is detected with the assumed AF frequency to the actual best in-focus position $P_{focus}$. As a result, the focus position can be shifted so as to agree with the best in-focus position $P_{focus}$. That is to say, this number of pulses is data representing the magnitude of focus shift toward the actual drive position after the peak has been detected by performing the AF operation. Hereinafter, such an operation will be described in further detail with reference to FIG. 7.

Figure 7:
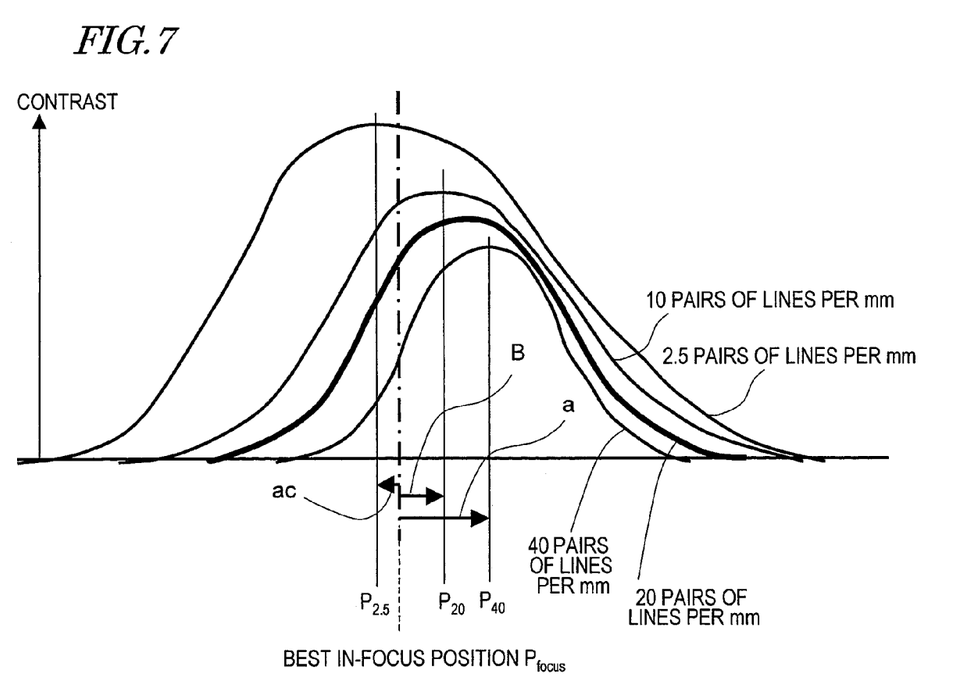
FIG. 7 shows contrast curves for four different assumed AF frequencies.

FIG. 7 shows contrast curves for four different assumed AF frequencies. Among the contrast curves, data of the contrast curves for three assumed AF frequencies of 40 pairs of lines per mm, 10 pairs of lines per mm and 2.5 pairs of lines per mm are adopted as AF correction data shown in FIG. 6.

The data shown in FIG. 7 was collected using the central AF frame 31 in a situation where the focus length f was 14 mm and the subject distance was 3 m. In FIG. 7, the best in-focus position $P_{focus}$ is also indicated. Also, in FIG. 7, a contrast peak position associated with each assumed AF frequency is identified by the same subscript as the assumed AF frequency's. For example, a contrast peak position associated with an assumed AF frequency of 40 pairs of lines per mm is identified by $P_{40}$.

Now look at the contrast peak positions of the respective assumed AF frequencies. Supposing the best in-focus position $P_{focus}$ is a reference position, P2.5 has shifted to the left by ac, and P20 and P40 have shifted to the right by B and a, respectively. That is why if the group of focusing lenses 201 is driven from these peak positions in such directions and by such distances as to cancel these shifts, the focus position can be moved to the best in-focus position $P_{focus}$. Thus, values representing the number of drive pulses to be applied to move the focus position to the best in-focus position $P_{focus}$ under the conditions described above including various combinations of the AF frames, the focal lengths f and the assumed AF frequencies are shown in FIG. 6.

As described above, the camera body 1 to be combined with the lens unit 2 has its own evaluated AF frequency. That is why its evaluated AF frequency could be different from the assumed AF frequency shown in FIG. 6. On top of that, according to the shooting conditions, the focal length and the subject distance could also be different. For that reason, according to this preferred embodiment, the ALU 103 of the lens unit 2 figures out the AF correction data by making interpolations. As a result, AF correction data associated with each camera body can be figured out according to each specific combination of shooting conditions and the focus position can be moved to the best in-focus position $P_{focus}$ just as intended.

Hereinafter, it will be described with reference to FIG. 8 how the camera system 100 performs the AF operation.

Figure 8:
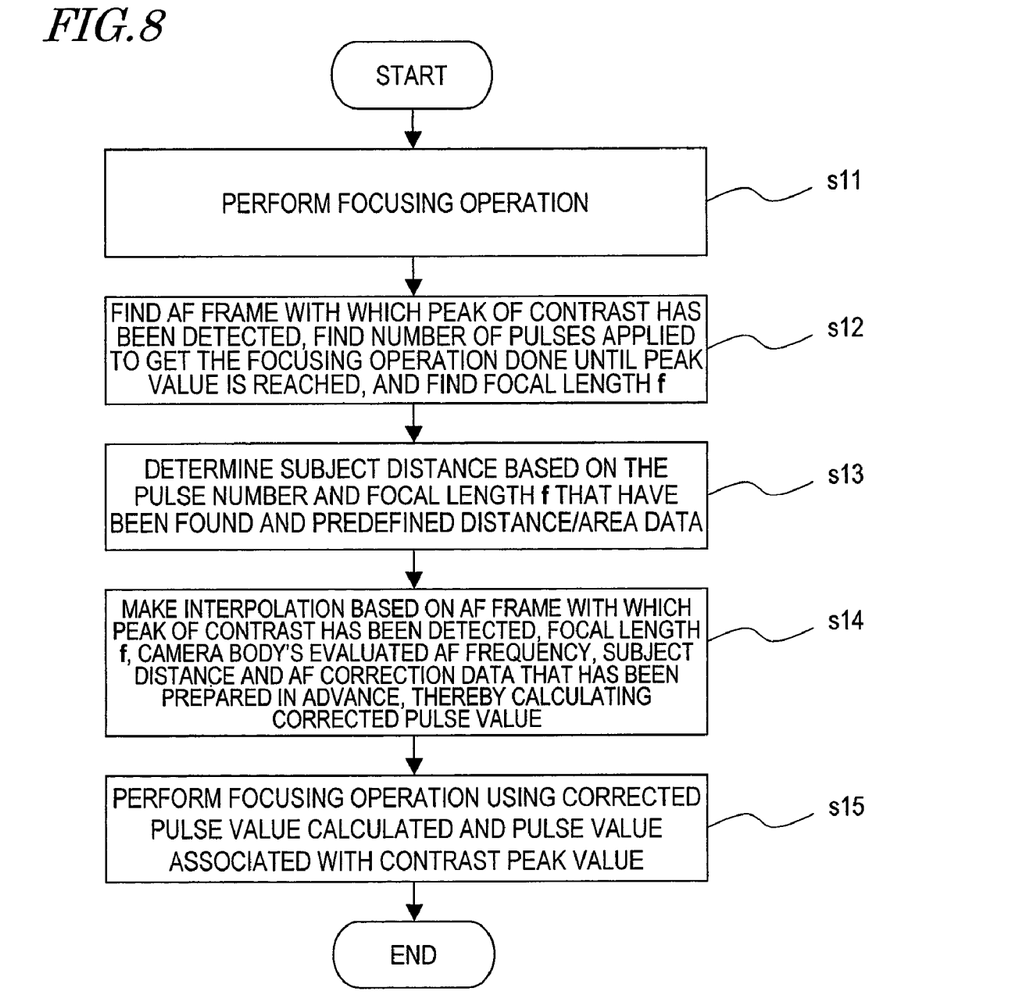
FIG. 8 is a flowchart showing the procedure of AF processing to get done by the camera system 100 of this preferred embodiment.

FIG. 8 shows the procedure of the AF processing to get done by the camera system 100 of this preferred embodiment. In the following description of this preferred embodiment, the processing shown in FIG. 4 is supposed to be carried out by the lens controlling microcomputer 220 of the lens unit 2 and the system controlling microcomputer 120 of the camera body 1 in cooperation with each other.

Suppose the lens unit 2 and the camera body 1 have the following sets of specifications (1) and (2), the lens status is defined by the following set of conditions (3) and a shooting operation has been performed by releasing the shutter under these sets of conditions:

(1) specifications of the lens unit 2 including: an F number of 3.5, a focus length f of 14 mm to 50 mm, the nearest possible distance of 500 mm, and 1,300 pulses applied between the farthest end and the nearest end of the focus stroke;

(2) specifications of the camera body 1 including: the imaging device 101 having 3,136×2,352=7,375,872 pixels, a pixel pitch of 5.6 µm, an image capturing size of 17.5616 mm×13.1712 mm, a diagonal size of 21.952 mm, an evaluated AF frequency of 5 pairs of lines per mm, and the peak of contrast being detected with the band of the evaluated AF frequency extracted from the video signal; and (3) lens status conditions including: an F number of 3.5 (full aperture), a degree of zooming (focal length) f of 14 mm and a subject distance of 3 m.

When the lens unit 2 and the camera body 1 are connected together and the camera body 1 is turned on before the shooting operation is started, the system controlling microcomputer 120 and the lens controlling microcomputer 220 are supposed to be communicating with each other through the lens unit's and camera body's communicating contacts 240 and 140 to perform initialization processing. As a part of the initialization processing, the lens controlling microcomputer 220 may send the AF correction data shown in FIG. 6 and stored in the memory 221 and the distance/area data shown in FIG. 9 (to be described later) collectively to the system controlling microcomputer 120 in the camera body 1. In response, the system controlling microcomputer 120 stores the received data in the memory 124. Thereafter, when the shutter release button is pressed halfway, the AF operation gets started from the processing step S11.

First, in Step S11, the focusing mechanism with actuator 202 of the lens unit 2 performs a focusing operation. This operation is performed in accordance with a focus lens scan drive instruction that has been given to the lens unit 2 by the system controlling microcomputer 120 in the camera body 1 to detect a peak. Specifically, the focusing mechanism with actuator 202 reads the position pulse data of the group of focusing lenses 201 and transfers the data through the lens controlling microcomputer to the system controlling microcomputer in the camera body 1 while performing a scan drive on the group of focusing lenses 201.

Next, in Step S12, the ALU 103 defines the parameters based on a result of the focusing operation, i.e., the AF frame with which the peak of contrast has been detected, the number of pulses applied to get the focusing operation done until the peak value is reached, and the focal length f.

Suppose the peak value has been detected within the central frame 31 that is located at the center of the screen. The lens controlling microcomputer 220 already knows how many pulses (which may be 370 pulses, for example) have been applied to get the focusing operation done until the peak value is detected, and conveys information about that pulse number to the system controlling microcomputer 120. Then the ALU 103 gets the pulse number information by way of the system controlling microcomputer 120. As for the focal length f, the lens controlling microcomputer 220 can also find it to be 14 mm according to the status of the group of zooming lenses 210. Consequently, information about that focal length f is also conveyed as it is to the ALU 103.

Next, in Step S13, the ALU 103 determines the subject distance based on the pulse number and focal length f that have just been found and predefined distance/area data.

Figure 9:
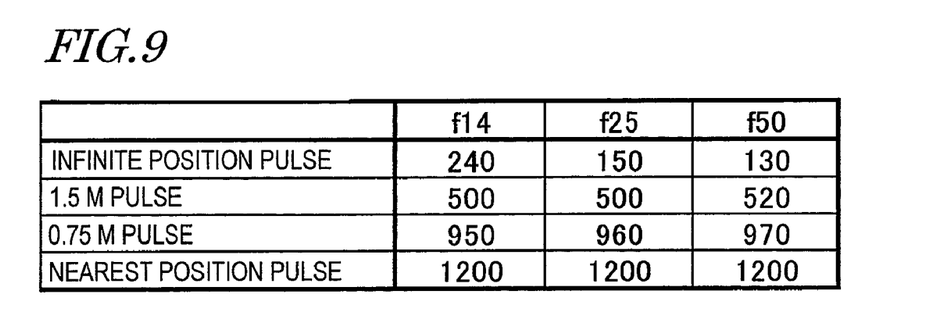
FIG. 9 shows examples of the distance/area data.

FIG. 9 shows examples of the distance/area data. According to the data shown in FIG. 9, the ALU 103 can compute data about focus pulse ranges that are respectively associated with subject distances of 3 m, 1 m and 0.6 m shown in FIG. 7. For example, at a focus length f of 14 mm, the ALU 103 may sense a range from an infinite position pulse (corresponding to 240 pulses) to a 1.5 m position pulse (corresponding to 500 pulses) to be a pulse range associated with the 3 m data, a range from the 1.5 m position pulse (corresponding to 500 pulses) to a 0.75 m position pulse (corresponding to 950 pulses) to be a pulse range associated with the 1 m data, and a range from the 0.75 m position pulse (corresponding to 950 pulses) to the minimum object distance pulse (corresponding to 1,200 pulses) to be a pulse range associated with the 0.6 m data, respectively. In this preferred embodiment, the number of pulses corresponding to the magnitude of focus drive from the farthest end to the nearest end is supposed to be 1,300. That is to say, the farthest end is defined by zero pulses and the nearest end by 1,300 pulses.

As described above, in this preferred embodiment, the focal length f is supposed to be 14 mm and the number of pulses applied to get the focusing operation done is supposed to be 370. Since 370 pulses are between the infinite position pulse (240 pulses) and the 1.5 m position pulse (500 pulses), the ALU 103 senses the subject be present within the 3 m distance range.

Once the peak position pulse has been detected, the system controlling microcomputer 120 instructs the lens controlling microcomputer 220 to stop the scan operation and once bring the group of focusing lenses 201 back toward the position where the scan drive was started by a length that is greater than the magnitude of hysteresis and then stop it.

Now take a look at FIG. 8 again. In Step S14, the ALU 103 makes interpolation based on the AF frame with which the peak of contrast has been detected, the focal length f, the camera body's evaluated AF frequency, the subject distance and the AF correction data that has been prepared in advance, thereby calculating a corrected pulse value.

As mentioned for the specifications (2) of the camera body 1, the camera body 1 has an evaluated AF frequency of 5 pairs of lines per mm. Meanwhile, no assumed AF frequency of 5 pairs of lines per mm has been defined as the AF correction data (see FIG. 6). Thus, the ALU 103 makes an interpolation based on the data about assumed AF frequencies of 2.5 pairs of lines per mm and 10 pairs of lines per mm, between which is the frequency of 5 pairs of lines per mm, thereby obtaining data about the assumed AF frequency of 5 pairs of lines per mm.

Since the AF frame with which the peak of contrast has been detected is defined to be the central AF frame, and the focal length f and the subject distance are defined to be 14 mm and 3 m, respectively, the AF correction data required includes a data value B defined by a combination of an assumed AF frequency of 10 pairs of lines per mm, a subject distance of 3 m, the central AF frame, and a focal length f of 14 and a data value ac defined by a combination of an assumed AF frequency of 2.5 pairs of lines per mm, a subject distance of 3 m, the central AF frame, and a focal length f of 14. An interpolation approximation is carried out using these two sets of data. For example, two points to be subjected to a linear interpolation and defined by the coordinates (x, y)=(2.5, ac) and (10, B) may be connected together with a line and the y coordinate of a point on that line with an x coordinate of 5 needs to be found. Thus, the y coordinate may be calculated by (B−ac)(5−2.5)/7.5+ac.

The interpolation does not have to be performed using a linear function (i.e., as a linear interpolation) but may also be carried out by least squares approximation, cubic interpolation, Lagrange interpolation, spline interpolation, Sinc function interpolation, or Lanczos interpolation, for example.

As a result of the processing described above, a pulse value required (which will be referred to herein as a "corrected pulse value") for the combination of an assumed AF frequency of 5 pairs of lines per mm, a subject distance of 3 m and a focal length f of 14 mm is calculated.

According to the shooting conditions, the focal length of the lens unit 2 could be present between f14, f25 and f50 and no data might be available. In that case, the ALU 103 may perform an interpolation approximation on the available data in accordance with the zooming position information provided by the lens unit 2 and may calculate the corrected pulse value.

Next, in Step S15, the ALU 103 sends the corrected pulse value calculated and a pulse value corresponding to the peak of contrast to the system controlling microcomputer 120, which in turn transfers them to the lens controlling microcomputer 220. The focusing mechanism with actuator 202 drives the group of focusing lenses 201 and performs a focusing operation based on those values. As a result of the focusing operation, the focus position moves to the best in-focus position $P_{focus}$ to end the AF operation.

As described above, according to this preferred embodiment, AF can always get done at the best in-focus position, no matter how a group of interchangeable lenses of multiple different types that would produce different degrees of spherical aberrations on lenses and a group of cameras of multiple different types with mutually different evaluated AF frequencies are combined with each other in the contrast-based AF interchangeable lens camera system 100.

In the preferred embodiment described above, the distance/area data shown in FIG. 9 and the AF correction values shown in FIG. 6 are supposed to be sent collectively to the system controlling microcomputer 120. However, these data do not have to be sent at a time. Alternatively, after the interpolation approximation has been performed by either the ALU 103 in the lens unit 2 or the system controlling microcomputer 120, only four items of data about the infinite position pulse, the 1.5 m position pulse, the 0.75 m position pulse and the minimum object distance pulse at the current zooming position may be transmitted.

Also, in the preferred embodiment described above, as long as the pulse value used to get the focusing operation done falls within the pulse range defined by the distance/area data shown in FIG. 9, one of the values shown in FIG. 6 is adopted, no matter where the pulse value is located within that range. However, the center of that range may be set at the 3 m pulse position, 1 m pulse position or 0.6 m pulse position, the data shown in FIG. 6 may be associated with that position, and the interpolation approximation may be carried out between those pulse positions to calculate the AF correction value. According to such a method, the accuracy of the distance-dependent AF correction value can be increased.

In the preferred embodiment described above, the lens optical system including the group of focusing lenses 201 and the group of zooming lenses 210 is an exemplary optical system according to the present invention. And the group of focusing lenses 201 and the focusing mechanism with actuator 202 for detecting the position of the group of focusing lenses 201 and moving them to the target position form an exemplary focusing mechanism according to the present invention.

The microcomputers 120 and 220 are exemplary computing sections for computing the AF correction data. Optionally, the system controlling microcomputer 120 may perform the functions of the signal processor 102 and the ALU 103. Alternatively, the system controlling microcomputer 120, the signal processor 102 and the ALU 103 may be implemented as a single arithmetic and logic unit. And such an arithmetic and logic unit is another example of the computing section of the present invention. The connector 230 is an exemplary connection means according to the present invention. The group of data about the distances between the contrast peak positions associated with two or more assumed AF frequencies stored in the storage means and the actual best in-focus position may be either immediate values or data that has been subjected to reproducible data conversion.

As for the AF frame, only the central AF frame located at the center of the screen may be used. The computation that uses the group of data about the distances between the contrast peak positions associated with two or more assumed AF frequencies and the actual best in-focus position may be carried out such that data associated with the assumed AF frequency that is closest to the camera body's own evaluated AF frequency is selected among two or more items of data. The number of groups of data about the distances between the contrast peak positions associated with two or more assumed AF frequencies and the actual best in-focus position may be two or more so as to be associated with F numbers while the AF operation is being carried out.

Furthermore, if the F number during the focusing operation is greater than a predetermined value, the ALU 103 may calculate a correction value corresponding to a zero correction so as not make a correction.

In the preferred embodiment described above, the corrected pulse value is calculated by making an interpolation. However, an extrapolation may also be carried out instead of the interpolation. If at least two sets of AF correction data are prepared in advance for the assumed AF frequency or the focal length f being calculated, the desired data can be obtained by performing the interpolation and extrapolation in any arbitrary combination.

Meanwhile, a method that does not use interpolation could be adopted as well. For example, the ALU 103 may find an assumed AF frequency that is closest to the evaluated AF frequency and use AF correction data associated with the assumed AF frequency that has been found to calculate the corrected pulse value.

In the foregoing description, among various types of processing to get done by the camera system 100 shown in FIG. 8, the processing to be done by the camera body 1 is supposed to be executed mainly by the ALU 103 and the system controlling microcomputer 120 in cooperation with each other. However, that processing could be done by either the system controlling microcomputer 120 or the ALU 103 alone. For example, if it is the system controlling microcomputer 120 that is in charge of the processing, then the system may be designed such that a software program that is stored in advance in the memory 124 is executed by the system controlling microcomputer 120. According to such a configuration, as long as a given camera body can be connected to the lens unit 2 that can perform the processing shown in FIG. 8, that camera body can get the processing shown in FIG. 8 done along with the lens unit 2 by updating the software afterward.

Industrial Applicability

The present invention is applicable to a contrast-based AF interchangeable lens camera system including a group of interchangeable lenses of multiple different types that would produce different degrees of spherical aberrations and a group of cameras of multiple different types with mutually different evaluated AF frequencies. Among other things, the present invention can be used particularly effectively in a digital single lens reflex camera with a live viewing mode.

The invention claimed is:

1. A camera system including a lens unit and a camera body, one of which is removable and attachable from/to the other,
   wherein the lens unit comprises:
   an optical system for producing an image of a subject;
   a focusing mechanism for performing a focusing operation by changing a subject distances with at least a portion of the optical system driven continuously;
   a first computing section for acquiring shooting parameters as the focusing operation is performed; and
   a storage section that stores reference data for use to correct focus positions according to a contrast of a video, the reference data being defined by a combination of any of two or more assumed AF frequencies for use to measure the contrast and any of the multiple shooting parameters, and
   wherein the camera body comprises:
   an imaging device, which receives the subject's image and outputs a video signal representing the subject's image; and
   a second computing section for measuring a contrast of the video of the subject based on an evaluated AF frequency proper to the camera body, which is determined in advance, during the focusing operation and calculating a correction value based on the shooting parameter and the reference data associated with a highest contrast, and
   wherein the focusing mechanism changes the focus positions according to the correction value.

2. The camera system of claim 1, wherein the reference data is defined by a combination of any of multiple areas on the video of the subject, any of the two or more assumed AF frequencies, and the multiple shooting parameters.

3. The camera system of claim 2, wherein the reference data is defined by a combination of any of multiple areas that include a central area of the video of the subject, any of the two or more assumed AF frequencies, and the multiple shooting parameters.

4. The camera system of claim 3, wherein if the evaluated AF frequency proper to the camera body is different from any of the two or more assumed AF frequencies defined for the reference data,
   the second computing section measures the contrast of the video of the subject based on the predetermined evaluated AF frequency proper to the camera body, finds one of the two or more assumed AF frequencies that is closest to the evaluated AF frequency proper to the camera body, and calculates the correction value using some of the reference data that is associated with the assumed AF frequency that has been found closest.

5. The camera system of claim 3, wherein if the evaluated AF frequency proper to the camera body is different from any of the two or more assumed AF frequencies defined for the reference data,
   the second computing section measures the contrast of the video of the subject based on the predetermined evaluated AF frequency proper to the camera body, detects at least two of the two or more assumed AF frequencies, and calculates the correction value by performing an interpolation operation on some of the reference data that is associated with the at least two assumed AF frequencies detected.

6. The camera system of claim 1, wherein an F number during the focusing operation is used as the shooting parameters, associated with each said F number, the reference data is defined by at least two combinations of the two or more assumed AF frequencies and the multiple shooting parameters.

7. The camera system of claim 1, wherein the reference data is defined with respect to a full-aperture F number, and wherein if an F number during the focusing operation is not equal to the full-aperture F number, the second computing section calculates a correction value for narrowing a difference between a position where the highest contrast is measured and a best in-focus position associated with the F number, based on the F number, an F number associated with a correction value of zero which is determined in advance, and data representing the difference between the position where the highest contrast is measured and the best in-focus position associated with the full-aperture F number.

8. The camera system of claim 1, wherein if an F number during the focusing operation is greater than a predetermined value, the second computing section calculates a correction value corresponding to a magnitude of correction of zero.

9. The camera system of claim 1, wherein the reference data is defined by combinations of respective assumed AF frequencies of at least 2.5 pairs of lines per mm, 10 pairs of lines per mm, and 40 pairs of lines per mm and the multiple shooting parameters.

10. The camera system of claim 1, wherein the optical system includes a lens, and wherein the focusing mechanism moves the lens by a distance corresponding to a number of drive pulses, and wherein the reference data and the correction value are defined by the number of the drive pulses.

11. The camera system of claim 1, wherein the reference data represents a difference between a position where the contrast becomes the highest and the best in-focus position.

* * * * *